No. 668,978.  
Patented Feb. 26, 1901.
A. G. CARLSON.
CONTROLLING DEVICE FOR ELECTRIC MOTORS.
(Application filed May 19, 1899.)
(No Model.)  
3 Sheets—Sheet 1.
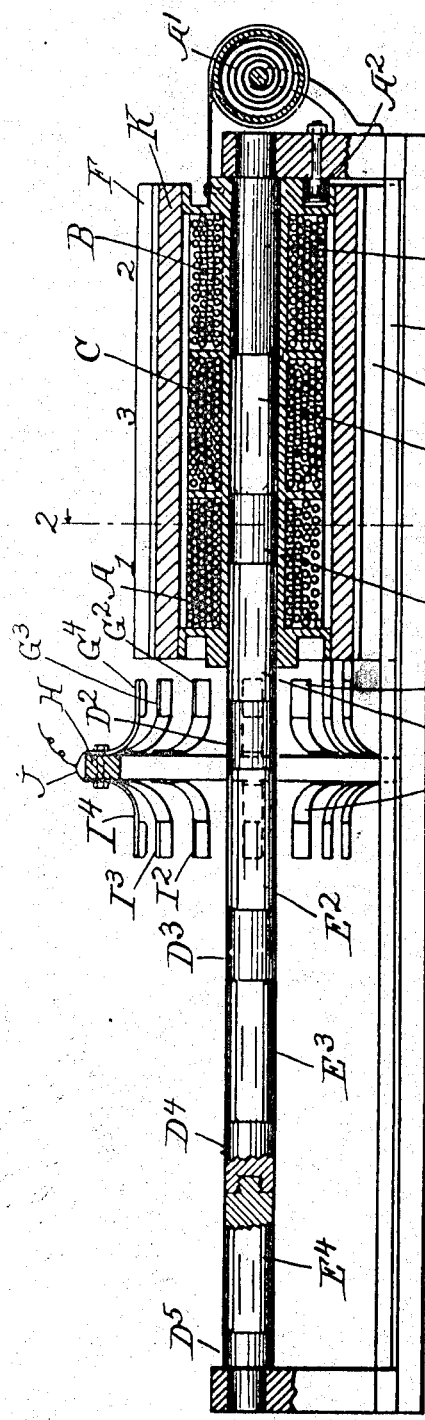
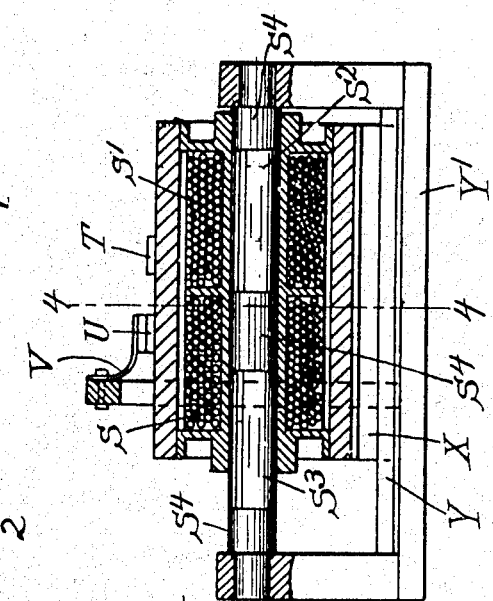
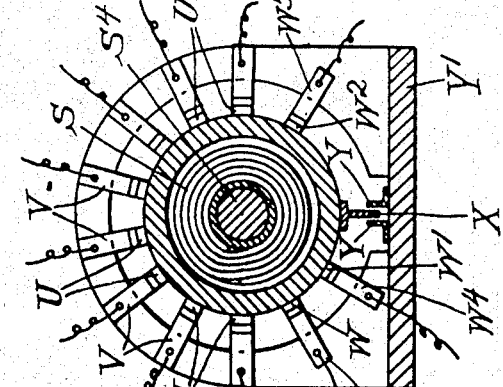
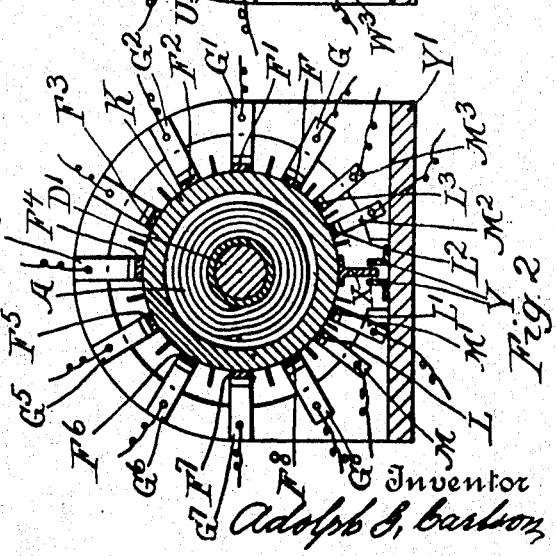
Witnesses  
Edward T. Wray  
Donald M. Carter
Inventor  
Adolph G. Carlson No. 668,978. Patented Feb. 26, 1901.
A. G. CARLSON.
CONTROLLING DEVICE FOR ELECTRIC MOTORS.
(Application filed May 19, 1899.)
(No Model.) 3 Sheets—Sheet 2.
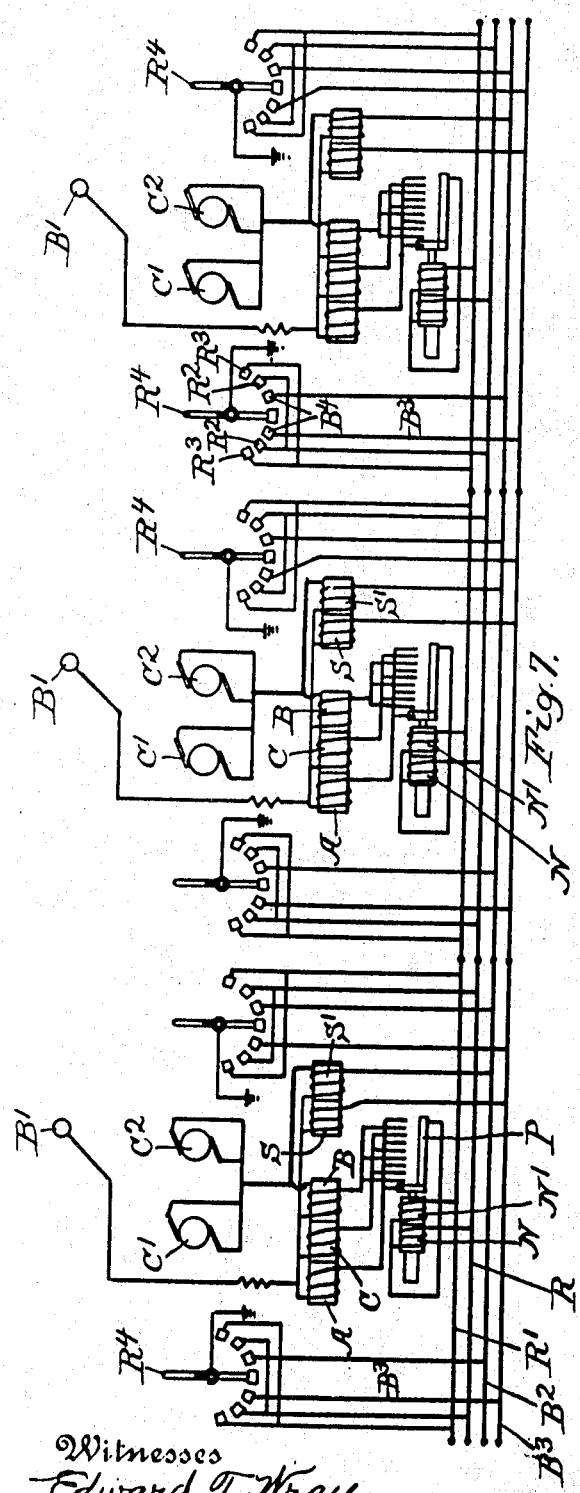
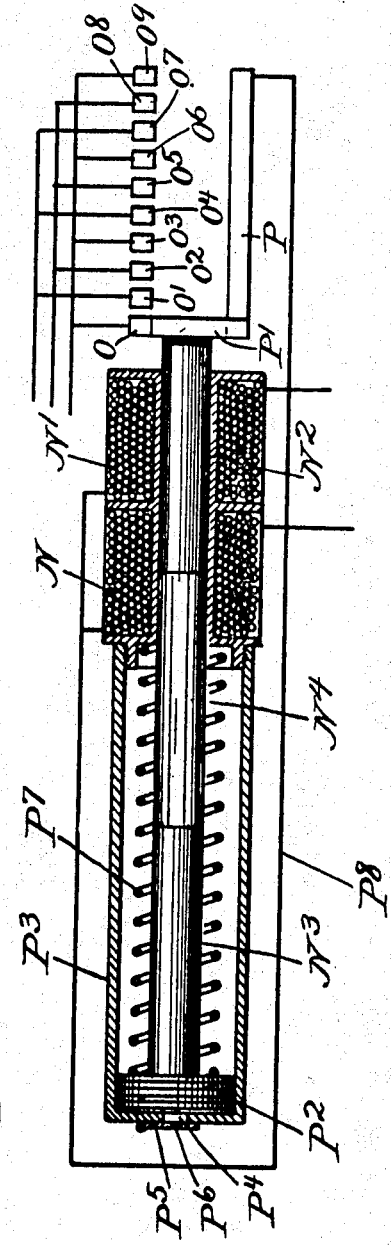
Witnesses
Edward T. Wray.
Donald M. Carter.
Inventor
Adolph G. Carlson

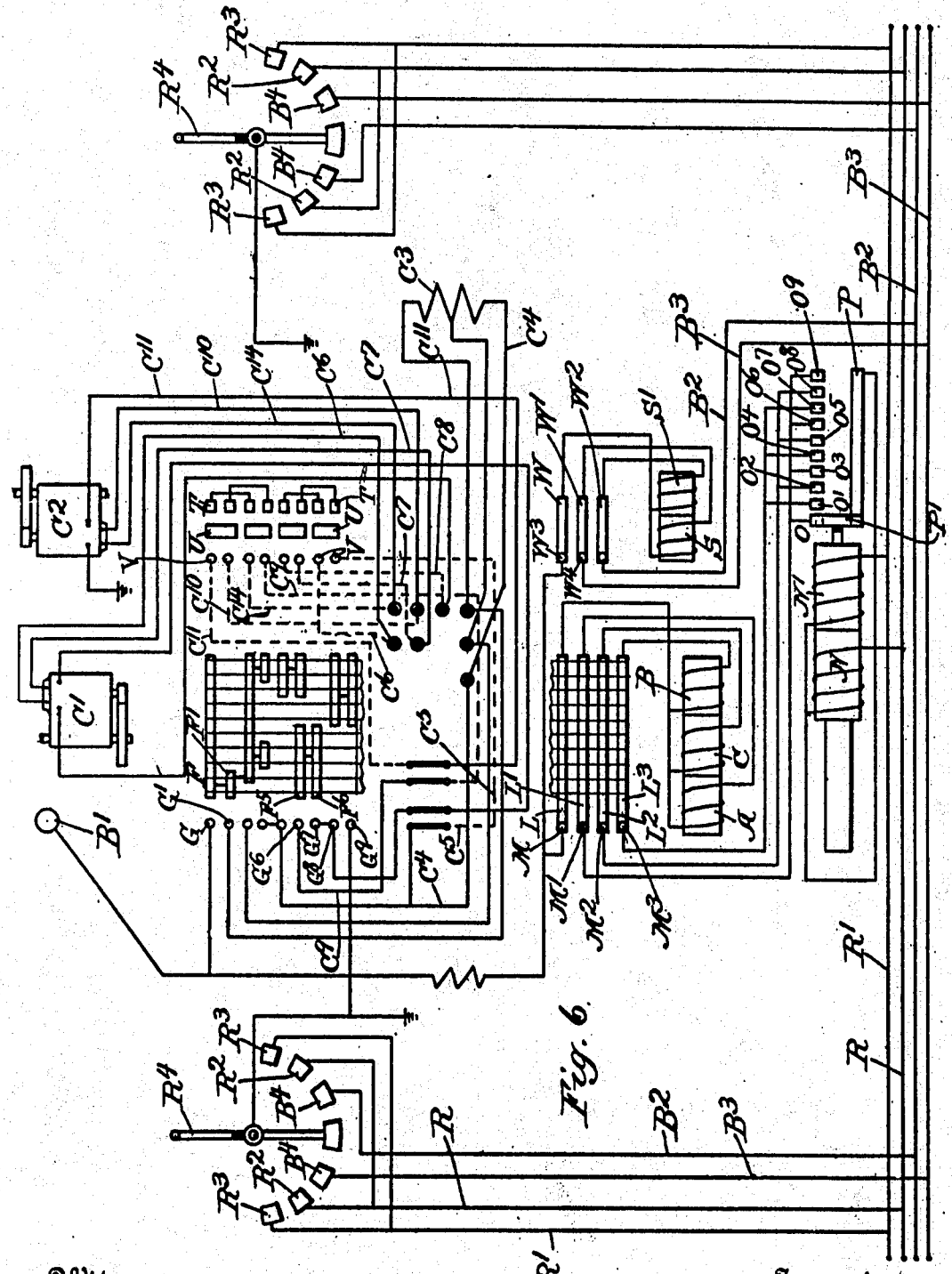

UNITED STATES PATENT OFFICE.

ADOLPH G. CARLSON, OF CHICAGO, ILLINOIS.

CONTROLLING DEVICE FOR ELECTRIC MOTORS.

SPECIFICATION forming part of Letters Patent No. 668,978, dated February 26, 1901.

Application filed May 19, 1899. Serial No. 717,398. (No model.)

*To all whom it may concern:*

Be it known that I, ADOLPH G. CARLSON, a citizen of the United States, residing at Chicago, in the county of Cook and State of Illinois, have invented a certain new and useful Improvement in Controlling Devices for Electric Motors, of which the following is a specification.

My invention relates to controlling devices for motors and the like, and has for its object to provide a new and improved controlling device of this description.

My invention is illustrated in the accompanying drawings, wherein—

Figure 1 is a view in part section, showing a controller proper embodying my invention and adapted to be used in controlling an electric motor. Fig. 2 is a section on line 2 2, Fig. 1. Fig. 3 is a view in part section of a reversing device constructed upon the same lines as the controller proper. Fig. 4 is a section on line 4 4, Fig. 3. Fig. 5 is a view in part section of a retarding device for retarding or governing the operation of the controller proper. Fig. 6 is a diagrammatic view showing the connections when the several devices are connected in circuit with two motors, the circuits being particularly adapted for street-car service. Fig. 7 is a diagrammatic view showing several street-cars or vehicles connected in circuit, so that they may all be operated simultaneously.

Like letters refer to like parts throughout the several figures.

The controlling device herein shown may be used for any suitable purpose and in connection with any desired system of circuits. For purposes of illustration I have shown the device as connected in a circuit particularly adapted for street-car service.

Referring now to Fig. 1, I have shown a device arranged for controlling the admission of current to an electric motor. This device consists of a series of coils of wire or a coil of wire divided into several sections, said coil being provided with a core made up of pieces of magnetic material and pieces of non-magnetic material connected together. The coil and core are so arranged that by varying the length of the coil energized in a predetermined manner or by admitting current into the several sections of the coil in a predetermined manner the relative movement of the coil and the core will be produced.

Referring now more particularly to the drawings, I have shown a coil made up of three sections A, B, and C, the coil being provided with a hollow center into which is received a suitable core. This core is made up of a series of pieces D D' D², &c., of non-magnetic material, separated by a series of pieces E E' E², &c., of magnetic material, the several pieces being formed into a continuous core. I have shown a construction wherein the core is held stationary and the coil is moved therealong; but it is of course evident that the coil may be held stationary and the core permitted to move, if desired. When the parts are in their initial position, as shown in Fig. 1, the piece of magnetic material E' projects only partially into the section A of the coil. If now the section A is energized, it attracts the magnetic piece E', and since the coil is free to move said coil will be moved forward until the piece E' is entirely contained within said section. When this occurs, a condition of equilibrium is established. The magnetic piece E now projects only partially into the section B, and hence if the section A is deënergized and section B energized the coil will move forward another step—that is, until the magnetic piece E is completely within the section B. When the parts are in this position, the magnetic piece E' projects only partially into section C, and hence if section B is deënergized and section C energized the coil will move up another step. After this latter movement of the coil the parts are in such position that the magnetic piece E² projects partially into section A and bears the same relation to said section as the magnetic piece E' in Fig. 1. If now the current is admitted to the sections in the order above described, the coil will be advanced, as hereinbefore set out. Some suitable means is provided for bringing the parts back to their initial position when the current through the coil is broken. This result may be obtained in any desired manner—as, for example, by providing the spring A', attached to some fixed part and also attached to the coil. In constructions where the relative movement of the coil and core is comparatively large the parts may be brought back to their initial position with considerable force, and hence it may be necessary to provide some means for gradually bringing the parts to rest. This may be attained in any desired manner—as, for example, by means of one or more pistons $A^2$, working in suitable openings to act as dash-pots. When the device is constructed as a controller, the coil is provided with one or more insulated contacts. As herein shown, the device is provided with a series of insulated contacts F F' $F^2$, insulated from each other by the insulating-piece K. Said insulated contacts are opposed to suitable contacts G G' $G^2$, &c., supported in proximity thereto, so as to engage the same as the coil is moved. These contacts, as well as their size and relative position, will depend upon the circuits to be controlled and the results desired. I have shown the contacts G G' $G^2$, &c., supported by the insulated piece H, and I have shown an additional set of contacts I I', &c., similar to the contacts G G', the corresponding contacts being electrically connected together, as shown at J. The contacts I I', &c., act after the coil has moved from beneath the contacts G G', &c. The coil is also provided with the contacts L, L', $L^2$, and $L^3$ and the opposed contacts M, M', $M^2$, and $M^3$ for controlling the circuit through its various sections. These various circuits are shown diagrammatically in Fig. 6. The current may be passed through the various sections of the coil in any desired manner—as by means of a hand-lever—for this purpose. I prefer, however, to provide a retarding or governing device for retarding the admission of the current, so as to prevent the operator from admitting the current too rapidly, and thus avoid the evils resulting therefrom. Any suitable retarding device may be used for this purpose. I prefer, however, to have the retarding device entirely out of the control of the operator.

I have shown in Fig. 5 one construction by means of which this result may be obtained. This device consists of a solenoid or coil divided into the sections N and N' and provided with a core made up of alternate sections of magnetic and non-magnetic material. Any desired number of sections may be used for the coil and for the core. I have shown the core as made up of the sections $N^2$ and $N^3$, of non-magnetic material, and the section $N^4$, of magnetic material. A series of contacts O O' $O^2$, &c., are associated with the core of said solenoid and are opposed to the contact-strip P. The contacts O O', &c., are connected to the controller-contacts L L', &c., in the manner shown in Fig. 6. A contact P' is attached to the core of the solenoid and is adapted to successively connect the contacts O O' $O^2$, &c., with the contact-strip P as the core is moved. Said core is also provided with a piston $P^2$, which works in the cylinder $P^3$, provided with an admission-opening $P^4$, having a controlling-valve $P^5$. This valve is in turn provided with a small admission-opening $P^6$, which may be varied in size in order to regulate the speed at which the retarding device operates. A retracting-spring $P^7$ normally tends to force the core to its initial position when the circuit through the solenoid is broken. When the parts are in their initial position, as shown in Fig. 5, the magnetic piece $N^4$ projects only partially into the section N. If now the current is admitted into said section, the core will be gradually moved forward to a position of equilibrium, and since said core is longer than the section it will project partially into section N' when this position of equilibrium is reached. If now the current is admitted into section N', the core will be again moved forward. This movement of the core successively connects the contacts O O', &c., with the contact-strip P. The forward movement of the core is retarded by the partial vacuum produced back of the piston, which can only be relieved slowly by the admission of air through the opening $P^6$. It will thus be seen that the speed of the core may be controlled at will. When the current through the solenoid is broken, the retracting-spring $P^7$ moves the core back to its initial position, the valve $P^5$ opening during this movement of the core to prevent its being moved too rapidly. The contact-strip P is connected by conductor $P^8$ with the sections of the solenoid, said sections being connected to conductors R R'. (See Fig. 6.) These conductors are connected with the contacts $R^2$ $R^3$, associated with the controlling-handle $R^4$. This controlling-handle is connected with the ground, as shown. I have also shown a reversing device associated with the controller. This reversing device controls the circuits, so as to reverse the direction of rotation of the motor. Any suitable reversing device may be used. As herein shown I have provided a solenoid having two sections S S', provided with a core made up of pieces of magnetic material $S^2$ $S^3$, separated by pieces of non-magnetic material $S^4$. This reversing device is provided with two sets of contacts T and U, which are opposed to a series of contacts V. When the contacts U are connected with the contacts V, the circuits are arranged so that the motor will rotate in one direction, and when the contacts T are connected with the contacts V the circuits are arranged so that the motor will rotate in the opposite direction. When the contacts U and V are connected, the magnetic piece $S^3$ projects only partially into section S, and hence if the current is passed through said section the coil will be moved. The parts are so arranged that when equilibrium is obtained the contacts V and T will be connected. When in this position, the magnetic piece $S^2$ projects only partially into section S', and hence if the current is passed through said section the parts will be moved to disconnect contacts T and V and connect contacts U and V. The current is admitted to the coils by means of the contacts W, W', and W² and the opposed contacts W³, W⁴, and W⁵. The coils S and S' are connected, through contacts W and W³, with the trolley-wheel B' and also by conductors B² and B³ with the contacts B⁴, associated with the controlling-handle R⁴.

In Fig. 6 I have shown the several devices connected in circuit with the two motors C' and C². A suitable resistance C³ is also connected in circuit. This resistance is connected in circuit with the motors and the reversing device by a series of conductors C⁴ to C¹¹, inclusive. This figure shows one form of connections for use upon vehicles such as street-cars and the like, the vehicle being provided at each end with a controlling-handle R⁴. The parts and circuits are illustrated in a diagrammatic manner and not in their proper relation to each other, the intention being to prevent the confusion which would result if the several solenoids were shown as contained with the cylindrical parts upon which the contacts are mounted.

In Fig. 7 I have shown a diagrammatic view of the circuits when several vehicles or cars are connected in a train, the circuits being arranged so that all of the devices on all of the cars can be simultaneously operated from either end of either car or vehicle. When the devices herein shown are used on a vehicle, they may be placed in any convenient location—as, for example, beneath the seats—so as to be out of the way, and the controlling handle or handles may be located at any convenient part where they will occupy very little space, and yet permit the complete control of the mechanism.

I have described in detail a particular construction embodying my invention and have illustrated the several parts connected in circuit in a particular manner. It is, however, evident that the parts may be greatly varied in form, construction, and arrangement and may be connected in any desired circuit or with any desired mechanism, and that some of the parts may be omitted and others used in connection with parts not herein shown, without departing in any manner from the spirit of my invention, and I have not attempted to set forth the various uses to which my invention may be applied, as such uses will readily suggest themselves to those versed in the art. I therefore do not limit myself to the construction and arrangement shown.

When the coil is made movable, I prefer to provide some guiding device which prevents any rotation of the coil and insures its traveling forward in the proper position. Any device for this purpose may be used. In Figs. 1 to 4, inclusive, I have shown a projecting part X, which coöperates with suitable guides Y, attached to the supports Y'.

The use and operation of my invention are as follows: When the parts are arranged and connected in circuit as shown in Fig. 6, the controlling-handles R⁴ normally rest upon a dead contact. If now it is desired to start up the motors, one of the controlling-handles is moved to one of the contacts B⁴. If the controlling-handle is moved to the contact on the left, a circuit will be completed which will be traced as follows: from the trolley-wheel, through contacts W³ and W, to section S of the coil of the reversing device, thence through contacts W' and W⁴ and conductor B³ to contact B⁴, thence through the controlling-handle to the ground. If the parts of the reversing device are in the position shown in Fig. 3, the coil will be moved, as hereinbefore described, so that the contacts V and T will be connected. If now it is desired to have the motors rotate in the opposite direction, the controlling-handle is moved to the contact B⁴ on the right. A circuit will then be completed through section S' of the coil of the reversing device and the coil will be moved to the position shown in Fig. 3, so that the contacts V and U will be connected. If now the controlling-handle is moved onto contact R², a circuit will be completed through the controller proper and the retarding device, said circuit being as follows: from the trolley-wheel B' to contacts M and L, thence through section A of the controller-coil, thence through contacts L' and M' to contact O, thence through contacts P' and P to section N of the coil of the retarding device, and thence through conductor R, contact R², and controlling-handle R⁴ to the ground. Section A of the controller-coil is thus energized and the coil moved forward one step, so as to connect contacts F and G and contacts F' and G', the contacts F and F' being connected together, as shown in Fig. 6. A circuit will then be completed through the motors, which may be briefly traced as follows: from the trolley-wheel B' to contact G, thence through contacts F and F' to contact G', thence through resistance C³ and conductors C⁴ and C⁵ to contacts V and U of the reversing device, thence by conductor C⁶ through the armature of the motor C', thence by conductor C⁷ back to the contacts of the reversing device, thence by conductor C⁸ through the field-magnets of the motor C', thence back to contacts G⁸ and G⁷ of the controller, thence through contacts F⁶ and F⁵, which are electrically connected together, thence through contact G⁶, conductor C⁹, and the contacts of the reversing device, thence by conductor C¹⁴ through the armature of the motor C², thence by conductor C¹⁰ through the contacts of the reversing device and conductor C¹¹ through the field-magnets of the motor C², and thence to the ground. As the core of the retarding device moves forward the contact O is disconnected from the contact-strip P and the next contact O' connected therewith. The circuit through section A of the controller-coil is then broken and the circuit through section B completed, the circuit being traced as follows: from the trolley-wheel B' through contacts L and M to section B, thence through contacts L³ and M³ to contact O', thence to contact-strip P, thence through section N of the retarding device, and thence through conductor R, contact R², and the controlling-handle R⁴ to the ground. The coil of the controller proper will then be moved up another step and the circuits correspondingly varied. It is of course evident that these circuits may be varied in any desired manner, and as such circuits are no part of my present invention I will not further describe the circuits through the motors. After a predetermined length of time the contact O' is disconnected from the contact-strip P and the contact O² connected therewith. The circuit is then completed through section C of the controller-coil and the coil moved up another step, so as to further vary the circuit through the motors. This process continues until the contact O⁵ is connected with the contact-strip P. The controlling-handle R⁴ is then moved to contact R³, so as to connect section N' of the retarding device in circuit. The circuit will then be traced as follows: from the trolley-wheel B' through contacts M and L, thence through section C of the controller-coil, thence through contacts M² and L², contacts O⁵ and P', and contact-strip P to section N' of the coil of the retarding device, thence through conductor R' to contact R³, and thence through the controlling-handle to the ground. The contact P' is then moved up gradually, so as to successively engage the remaining contacts and operate the controller step by step until it reaches its extreme position.

When it is desired to stop the motors, the controlling-handle is moved back to the dead contact and the circuit is broken. The retracting-spring P⁷ then moves contact P' back to its initial position, and the retracting-spring A' moves the coil of the controller back to its initial position.

When the construction herein shown is used on cars or vehicles, it will be seen that it is only necessary to have one controller for each vehicle and that the controlling-handles may be provided at each end of the car, so that either one may be used to operate this controller.

Referring now to Fig. 7, I have shown diagrammatically the controlling mechanism for several cars or vehicles connected in a train. By connecting the conductors B³ B² and R' R of the several vehicles together, as shown, the controlling mechanism on all the vehicles may be operated simultaneously by any one of the controlling-handles.

I claim—

1. A circuit-varying device, comprising two parts movable with relation to each other, one a coiled conductor and the other a core therefor made up of pieces of magnetic and non-magnetic material, means for successively energizing different portions of said coil, so as to cause said portions to coöperate with the magnetic pieces of the core and produce a relative movement of the two parts, a circuit independent of said coil and provided with one or more contacts associated with the movable part so as to coöperate therewith.

2. A circuit-varying device, comprising two parts movable with relation to each other, one a coiled conductor and the other a core therefor made up of pieces of magnetic and non-magnetic material, means for successively energizing different portions of said coil, so as to cause said portions to coöperate with the magnetic pieces of the core and produce a relative movement of the two parts, one or more contacts associated with the movable part so as to coöperate therewith, and a retracting device for moving the parts to their initial position.

3. The combination with a coiled conductor divided into three or more sections of a core for said conductor made up of a series of pieces of magnetic material separated by pieces of non-magnetic material, the core and coil being movable with relation to each other, conductors leading to and from the three sections of said coil, whereby the current may be successively admitted into said sections in a predetermined manner, so as to produce a progressive step-by-step relative movement of the core and coil.

4. A circuit-varying device, comprising a coiled conductor divided into three or more sections, a core for said conductor made up of a series of pieces of magnetic material separated by pieces of non-magnetic material, the core and coil being movable with relation to each other, conductors leading to and from the three sections of said coil, whereby the current may be successively admitted into said sections in a predetermined manner, so as to produce a progressive step-by-step relative movement of the core and coil, and one or more contacts associated either with said coil or core so that the relative movement of the parts varies an electric current.

5. A circuit-varying device, comprising two parts movable with relation to each other, one a coiled conductor and the other a core therefor made up of pieces of magnetic and non-magnetic material, means for successively energizing different portions of said coil, so as to cause said portions to coöperate with the magnetic pieces of the core and produce a relative movement of the two parts, one or more contacts associated with the movable part so as to coöperate therewith, and a device for retarding the relative movement of the core and coil.

6. A circuit-varying device, comprising two parts movable with relation to each other, one a coiled conductor and the other a core therefor made up of pieces of magnetic and non-magnetic material, suitable contacts associated with said core or coil, so that their relative movement varies an electric circuit, said coil divided into a series of sections adapted to be separately energized, conductors leading to and from said sections, a device for preventing the too-rapid admission of the current into the sections of said coil, said device comprising a series of contacts arranged so that the circuits through said sections are normally open, a movable part adapted to be moved along said contacts so as to successively complete the circuits through the sections of said coil, and means for controlling the speed of said movable part.

7. A circuit-varying device, comprising two parts movable with relation to each other, one a coiled conductor and the other a core therefor made up of pieces of magnetic and non-magnetic material, suitable contacts associated with said core or coil, so that their relative movement varies an electric circuit, said coil divided into a series of sections adapted to be separately energized, conductors leading to and from said sections, a retarding device for preventing the too-rapid admission of the current into the sections of said coil, comprising a solenoid divided into two or more sections and provided with a core made up of alternate pieces of magnetic and non-magnetic material, the core and coil movable with relation to each other, a limiting device for limiting the speed of the relative movement of said core and coil, a series of contacts connected in circuit with the sections of the coil of the circuit-varying device, said contacts being successively connected in circuit by the relative movement of the core and coil of the retarding device.

8. A circuit-varying device, comprising a movable coiled conductor, a core therefor made up of pieces of magnetic and non-magnetic material, a series of electric contacts surrounding said coil and insulated from each other, a series of opposed contacts connected in suitable electric circuits, means for successively energizing different portions of said coil, so as to cause said portions to coöperate with the magnetic pieces of the core and produce a step-by-step forward movement of the core, whereby the contacts associated with the coil coöperate with the opposed contacts to vary an electric circuit.

9. A circuit-varying device, comprising a movable coiled conductor, a core therefor made up of pieces of magnetic and non-magnetic material, a series of electric contacts surrounding said coil and insulated from each other, a series of opposed contacts connected in suitable electric circuits, means for successively energizing different portions of said coil, so as to cause said portions to coöperate with the magnetic pieces of the core and produce a step-by-step forward movement of the core, whereby the contacts associated with the coil coöperate with the opposed contacts to vary an electric circuit, and suitable guides associated therewith to prevent the rotation of said coil.

10. A circuit-varying device, comprising a coiled conductor divided into three or more sections, a core for said conductor made up of a series of pieces of magnetic material separated by pieces of non-magnetic material, the core and coil being movable with relation to each other, a series of contacts associated with said parts so that an electric circuit will be varied by the relative movement of the parts, conductors leading to and from the several sections of said coil, whereby current will be successively admitted into said sections in a predetermined manner, so as to produce a progressive step-by-step relative movement of the core and coil, a series of contacts at a distance from the coil and electrically connected therewith, and a controlling-handle to coöperate with said contacts so as to control the passage of the current through the sections of the coil.

11. A circuit-varying device, comprising a series of contacts adapted when moved to control an electric circuit, means for moving said contacts, a device for retarding the movement of said contacts and comprising two parts movable with relation to each other, one a coiled conductor and the other a core therefor made up of pieces of magnetic and non-magnetic material, a circuit-controlling device associated with said parts and operated by the relative movement thereof, said circuit-controlling device associated with the moving means for said contacts, and a device for limiting the speed of the relative movement of said core and coil, whereby the varying of the electric circuit is retarded.

12. The combination with a controlling device of a device for retarding the operation thereof, said device comprising a coiled conductor, a core therefor, the conductor and core movably mounted with relation to each other, a series of electric contacts associated with the controller and adapted to be acted upon by the relative movement of said core and coil, said contacts independent of the motor-circuit and a speed-limiting device for limiting the speed of the relative movement of said core and coil.

13. The combination with a controller for motors of a device, comprising a coiled conductor, a core therefor, the conductor and core movable with relation to each other and so positioned that a relative movement is produced when the coil is energized, a series of contacts in circuit with the controller and adapted to be successively connected in circuit by the relative movement of the core and coil, a coöperating piston and cylinder, one connected with the core and the other with the coil, and means for controlling the admission of air to said cylinder, so as to limit the speed of the relative movement of said core and coil.

14. The combination with a controller for motors of a retarding device, comprising a coiled conductor, a core therefor, the conductor and core movable with relation to each other and so positioned that a relative movement is produced when the coil is energized, a series of contacts in circuit with the controller and adapted to be successively connected in circuit by the relative movement of
5 the core and coil, a coöperating piston and cylinder, one connected with the core and the other with the coil, means for controlling the admission of air to said cylinder, so as to limit the speed of the relative movement of said core and coil, and a retracting device for moving the parts to their initial position.

ADOLPH G. CARLSON.

Witnesses:
DONALD M. CARTER,
HOMER L. KRAFT.